United States Patent
Jiang et al.

(10) Patent No.: US 12,216,198 B2
(45) Date of Patent: Feb. 4, 2025

(54) COMPLEX RECURRENT NEURAL NETWORK FOR SYNTHETIC APERTURE RADAR (SAR) TARGET RECOGNITION

(71) Applicant: The Boeing Company, Chicago, IL (US)

(72) Inventors: Qin Jiang, Malibu, CA (US); David Wayne Payton, Malibu, CA (US); Soheil Kolouri, Agoura Hills, CA (US); Adour Vahe Kabakian, Monterey Park, CA (US); Brian N. Limketkai, Santa Monica, CA (US)

(73) Assignee: THE BOEING COMPANY, Arlington, VA (US)

(*) Notice: Subject to any disclaimer, the term of this patent is extended or adjusted under 35 U.S.C. 154(b) by 515 days.

(21) Appl. No.: 17/456,345

(22) Filed: Nov. 23, 2021

(65) Prior Publication Data
US 2022/0229173 A1    Jul. 21, 2022

Related U.S. Application Data

(60) Provisional application No. 63/135,553, filed on Jan. 8, 2021.

(51) Int. Cl.
G01S 13/90    (2006.01)

(52) U.S. Cl.
CPC ....... G01S 13/9011 (2013.01); G01S 13/9088 (2019.05)

(58) Field of Classification Search
CPC .................. G01S 13/9011; G01S 13/9088
(Continued)

(56) References Cited

U.S. PATENT DOCUMENTS

| | | | | |
|---|---|---|---|---|
| 5,463,397 A | * | 10/1995 | Frankot ............... | G01S 13/9023 342/25 C |
| 5,489,907 A | * | 2/1996 | Zink ................... | G01S 13/9092 342/25 C |

(Continued)

FOREIGN PATENT DOCUMENTS

| | | | | |
|---|---|---|---|---|
| CN | 108051809 A | * | 5/2018 | ........... G01S 13/904 |
| CN | 110472627 A | * | 11/2019 | ......... G01S 13/9004 |

(Continued)

OTHER PUBLICATIONS

Junyoung Chung, Caglar Gulcehre, Kyung Hyun Cho, and Yoshua Bengio, "Empirical Evaluation of Gated Recurrent Neural Networks on Sequence Modeling", arXiv:1412.3555v1, [cs.NE] Dec. 11, 2014.

(Continued)

*Primary Examiner* — Nuzhat Pervin
(74) *Attorney, Agent, or Firm* — MH2 TECHNOLOGY LAW GROUP LLP

(57) ABSTRACT

Disclosed is a synthetic aperture radar (SAR) system for target recognition with complex range profile. The SAR system comprising a memory, a recurrent neural network (RNN), a multi-layer linear network in signal communication the RNN, and a machine-readable medium on the memory. The machine-readable medium is configured to store instructions that, when executed by the RNN, cause the SAR system to perform various operations. The various operation comprise: receiving raw SAR data associated with observed views of a scene, wherein the raw SAR data comprises information captured via the SAR system; radio frequency (RF) preprocessing the received raw SAR data to produce a processed raw SAR data; converting the processed raw SAR data to a complex SAR range profile data; processing the complex SAR range profile data with the (Continued)

RNN having RNN states; and mapping the RNN states to a target class with the multi-layer linear network.

21 Claims, 9 Drawing Sheets

(58) Field of Classification Search
USPC .......................................................... 342/25
See application file for complete search history.

(56) References Cited

U.S. PATENT DOCUMENTS

| | | | | |
|---|---|---|---|---|
| 5,608,404 | A * | 3/1997 | Burns | G01S 13/9027 |
| | | | | 342/25 A |
| 6,492,932 | B1 * | 12/2002 | Jin | G01S 13/904 |
| | | | | 342/25 R |
| 6,573,856 | B1 * | 6/2003 | Obenshain | G01S 13/9023 |
| | | | | 342/25 R |
| 6,714,154 | B2 * | 3/2004 | Cirillo | H03M 7/40 |
| | | | | 342/25 R |
| 7,307,584 | B2 * | 12/2007 | Cirillo | H03M 7/30 |
| | | | | 342/195 |
| 9,261,593 | B1 * | 2/2016 | Mountcastle | G01S 13/9088 |
| 9,562,968 | B2 * | 2/2017 | Wu | G01S 3/74 |
| 9,621,175 | B2 * | 4/2017 | Pagnanelli | H03M 3/404 |
| 9,772,402 | B2 * | 9/2017 | Schuman | G01S 13/5244 |
| 9,978,013 | B2 * | 5/2018 | Kaufhold | G06N 3/045 |
| 10,107,904 | B2 * | 10/2018 | Reis | G01S 13/904 |
| 10,310,074 | B1 * | 6/2019 | Ni | G01S 13/9019 |
| 10,514,770 | B2 * | 12/2019 | Malysa | G01S 13/584 |
| 10,641,897 | B1 * | 5/2020 | Dussan | G01S 17/42 |
| 10,643,123 | B2 * | 5/2020 | Kaufhold | G01S 13/90 |
| 10,976,429 | B1 * | 4/2021 | Jiang | G06N 3/063 |
| 11,402,494 | B2 * | 8/2022 | Zhai | G06N 3/045 |
| 11,428,798 | B2 * | 8/2022 | Keijer | G01S 13/933 |
| 11,719,811 | B2 * | 8/2023 | Cho | G01S 13/872 |
| | | | | 342/350 |
| 11,720,799 | B2 * | 8/2023 | Jia | G06V 10/454 |
| 2004/0017307 | A1 * | 1/2004 | Cirillo | G01S 13/9027 |
| | | | | 342/25 R |
| 2004/0160353 | A1 * | 8/2004 | Cirillo | G01S 7/003 |
| | | | | 342/25 R |
| 2007/0188371 | A1 * | 8/2007 | Callison | G01S 7/295 |
| | | | | 342/25 A |
| 2007/0257835 | A1 * | 11/2007 | Cirillo | H03M 7/30 |
| | | | | 342/194 |
| 2010/0066598 | A1 * | 3/2010 | Sherman | G01S 13/9011 |
| | | | | 342/25 F |
| 2010/0321234 | A1 * | 12/2010 | Goldman | G01S 13/9029 |
| | | | | 342/25 A |
| 2011/0006944 | A1 * | 1/2011 | Goldman | G01S 13/9054 |
| | | | | 342/25 A |
| 2015/0287422 | A1 * | 10/2015 | Short | G01S 3/74 |
| | | | | 704/211 |
| 2016/0019458 | A1 * | 1/2016 | Kaufhold | G01S 13/9029 |
| | | | | 706/20 |
| 2018/0031690 | A1 * | 2/2018 | Schuman | G01S 7/288 |
| 2018/0172824 | A1 * | 6/2018 | Beckett | G01S 13/9027 |
| 2018/0260688 | A1 * | 9/2018 | Kaufhold | G01S 7/417 |
| 2018/0372862 | A1 * | 12/2018 | Ni | G01S 13/9017 |
| 2019/0383904 | A1 * | 12/2019 | Harrison | G01S 13/931 |
| 2020/0096630 | A1 * | 3/2020 | Fox | G01S 13/9056 |
| 2020/0142056 | A1 * | 5/2020 | Fox | G01S 13/9056 |
| 2020/0258296 | A1 * | 8/2020 | Pennings | G06T 15/205 |
| 2020/0341147 | A1 * | 10/2020 | Dussan | G01S 7/487 |
| 2021/0003697 | A1 * | 1/2021 | Zhai | G06N 3/08 |
| 2021/0027113 | A1 * | 1/2021 | Goldstein | G06F 18/24 |
| 2021/0173045 | A1 * | 6/2021 | Hu | G01S 7/415 |
| 2021/0270959 | A1 | 9/2021 | Jiang et al. | |
| 2022/0044199 | A1 * | 2/2022 | Pati | G06Q 40/02 |
| 2023/0176209 | A1 * | 6/2023 | Fox | G01S 13/9029 |
| | | | | 342/25 B |

FOREIGN PATENT DOCUMENTS

| | | | | |
|---|---|---|---|---|
| EP | 3422043 | A1 * | 1/2019 | G01S 13/90 |
| KR | 102141163 | B1 * | 8/2020 | G01S 13/904 |
| WO | WO-2008127335 | A1 * | 10/2018 | G01S 13/9035 |

OTHER PUBLICATIONS

Paul J. Werbos, "Backpropagation Through Time: What is does and How to do it", Proceedings of the IEEE, vol. 78, No. 10, pp. 1550-1560, 1990.

* cited by examiner

COMPLEX RECURRENT NEURAL NETWORK FOR SYNTHETIC APERTURE RADAR (SAR) TARGET RECOGNITION

CROSS-REFERENCE TO RELATED APPLICATIONS

This application claims the benefit of the filing date and right of priority under 35 U.S.C. § 119(e) of U.S. Provisional Patent Application No. 63/135,553 filed on Jan. 8, 2021, the disclosure of which is incorporated herein by reference in its entirety.

FIELD

The subject disclosure is related to Synthetic Aperture Radar (SAR) systems, and more particularly, for example, to systems and techniques for SAR target recognition.

BACKGROUND

Synthetic-aperture radar (SAR) Identifying targets from synthetic aperture radar (SAR) data is a widely-used technique, but most existing SAR automatic target recognition (ATR) systems use SAR images for target recognition. To form SAR images from raw SAR data, which is generated from backscattered radio frequency (RF) radar pulses that were reflected from a scene being observed by a SAR system on an ATR system, is a computationally intensive process. Generally, this technique prevents real-time computation for low size, weight and power (SWAP) SAR based ATR systems.

Some attempts have been made to process raw SAR data, which are complex radar pulses, instead of using the SAR images but these attempts generally have included using real SAR range profile data from the raw SAR data, which results in the loss of phase information of the SAR range profile data. Unfortunately, the phase information of SAR range profile data may provide helpful information to characterize the surfaces of a target because the depth variation of the surfaces of a target may result in a phase variation in the reflected RF pulses that are part of the raw SAR data. As such, the phase information of the raw SAR data may be helpful for target recognition.

Therefore, in relation to low SWaP SAR based ATR systems, contemporary SAR-based target identification techniques require extensive processing and data resources for SAR image reconstruction and feature detection which can present several challenges for low SWaP SAR based ATR systems, such as for example for systems with limited computational power and resources.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

Disclosed is a synthetic aperture radar (SAR) system for target recognition with complex range profile. The SAR system comprising a memory, a recurrent neural network (RNN), a multi-layer linear network, and a machine-readable medium on the memory. The machine-readable medium is configured to store instructions that, when executed by the RNN, cause the SAR system to perform various operations. The various operation comprise: receiving raw SAR data associated with observed views of a scene, wherein the raw SAR data comprises information captured via the SAR system; radio frequency (RF) preprocessing the received raw SAR data to produce a processed raw SAR data; converting the processed raw SAR data to a complex SAR range profile data; processing the complex range profile data with the RNN having RNN states; and mapping the RNN states to a target class with the multi-layer linear network.

In this example, the RNN and multi-layer linear network may be implemented on one or more processors and the RNN may be implemented as a gated recurrent unit (GRU) neural network (GRUNN).

In general, as an example of operation, disclosed is method comprising: receiving raw SAR data associated with observed views of a scene, where the raw SAR data comprises information captured via an automatic target recognition (ATR) system having a SAR system; radio frequency (RF) preprocessing the received raw SAR data to produce a processed raw SAR data; converting the processed raw SAR data to a complex SAR range profile data; processing the complex range profile data with a RNN having RNN states; and mapping the RNN states to a target class with a multi-layer linear network.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a synthetic aperture radar (SAR) system for target recognition with complex range profile. The SAR system comprising a memory, a recurrent neural network (RNN), a multi-layer linear network, and a machine-readable medium on the memory. The machine-readable medium is configured to store instructions that, when executed by the RNN, cause the SAR system to perform various operations. The various operation comprise: receiving raw SAR data associated with observed views of a scene, wherein the raw SAR data comprises information captured via the SAR system; radio frequency (RF) preprocessing the received raw SAR data to produce a processed raw SAR data; converting the processed raw SAR data to a complex SAR range profile data; processing the complex range profile data with the RNN having RNN states; and mapping the RNN states to a target class with the multi-layer linear network.

In this example, the RNN and multi-layer linear network may be implemented on one or more processors and the RNN may be implemented as a gated recurrent unit (GRU) neural network (GRUNN).

In general, as an example of operation, disclosed is method comprising: receiving raw SAR data associated with observed views of a scene, where the raw SAR data comprises information captured via an automatic target recognition (ATR) system having a SAR system; radio frequency (RF) preprocessing the received raw SAR data to produce a processed raw SAR data; converting the processed raw SAR data to a complex SAR range profile data; processing the complex range profile data with a RNN having RNN states; and mapping the RNN states to a target class with a multi-layer linear network.

SAR System

Figure 1A:
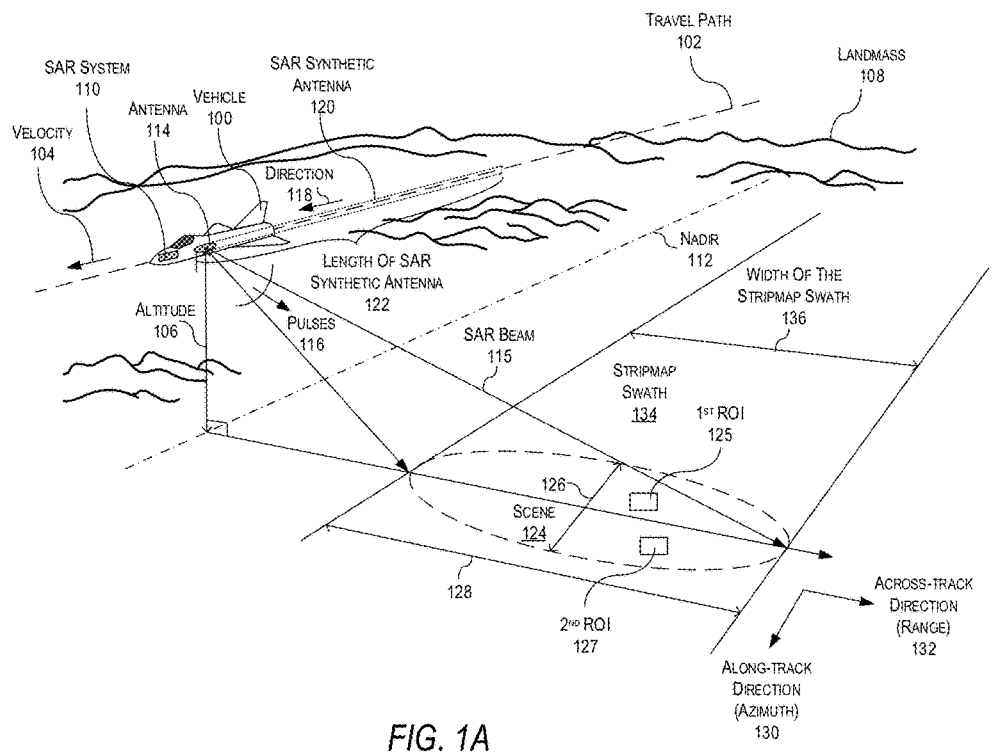
FIG. 1A is a perspective view of a diagram of an example of an implementation of a Synthetic Aperture Radar (SAR) system in a vehicle flying a course along a flight path over a landmass in accordance with the subject disclosure.

Turning to FIG. 1A, a perspective view of a diagram of an example of an implementation of a SAR system in a vehicle 100 in a stripmap mode flying along a straight flight path (i.e., travel path 102) with a constant velocity 104 and at a constant altitude 106 over a landmass 108 in accordance with the subject disclosure. The vehicle 100 (also known as a platform) can be, for example, a manned or unmanned aircraft such as an airplane, a drone, a spacecraft, a rotorcraft, or other type of unmanned or manned vehicle. The vehicle 100 flies along the travel path 102 at the constant altitude 106 such that a SAR system 110 (on the vehicle 100) is directly above a nadir 112. In this example, the nadir 112 is a locus of points on the surface of the Earth (e.g., the landmass 108) directly below an antenna 114 of the SAR system 110. It is appreciated by those of ordinary skill in the art that in radar systems the nadir 112 is the beginning of the range parameter of a SAR radar.

In an example of operation, the SAR system 110 radiates (e.g., transmits) SAR radar signal pulses 116 obliquely at an approximate normal (e.g., a right angle) direction to a direction 118 of the flight along the travel path 102. The SAR radar signal pulses 116 are electromagnetic waves that are sequentially transmitted from the antenna 114, which is a "real" physical antenna located on the vehicle 100. As an example, the SAR radar signal pulses 116 can be linear frequency modulated chip signals.

The antenna 114 is fixed and directed (e.g., aimed) outward from a side of the vehicle 100 at an obliquely and approximately normal direction to the side of the vehicle 100. The antenna 114 has a relatively small aperture size with a correspondingly small antenna length. As the vehicle 100 moves along the travel path 102, the SAR system 110 synthesizes a SAR synthetic antenna 120 that has a synthesized length 122 that is much longer than the length of the real antenna 114. It is appreciated by those of ordinary skill in the art that the antenna 114 can optionally be directed in a non-normal direction from the side of the vehicle 100. In this example, the angle at which the fixed antenna 114 is aimed away from the side of the vehicle 100 (and resultingly the travel path 102) will be geometrically compensated in the computations of the SAR system 110.

As the SAR radar signal pulses 116 hit the landmass 108 they illuminate an observed scene 124 (also referred to as a "footprint," "parch," or "area") of the landmass 108 and scatter (e.g., reflect off the landmass 108). In this example, the scene 124 can include one or more ROIs within the scene 124 such as, for example, first ROI 125 and second ROI 127. The illuminated scene 124 corresponds to a width 126 and 128 of the main beam of the real antenna 114 in an along-track direction 130 and across-track direction 132 as the main beam intercepts the landmass 108. In this example, the along-track direction 130 is parallel to the direction 118 of the travel path 102 of the vehicle 100 and it represents the azimuth dimension for the SAR system 110. Similarly, the across-track direction 132 is perpendicular (e.g., normal) to the travel path 102 of the vehicle 100 and it represents the range dimension of the SAR system 110. As the vehicle 100 travels along the travel path 102, the illuminated scene 124 defines a stripmap swath 134, having a swath width 136, which is a strip along the surface of the landmass 108 that has been illuminated by the illuminated scene 124 produced by the main beam of the antenna 114. In general, the length 122 of the SAR synthetic antenna 120 is directly proportional to the range in that as the range increases, the length 122 of the SAR synthetic antenna 120 increases.

Figure 1B:
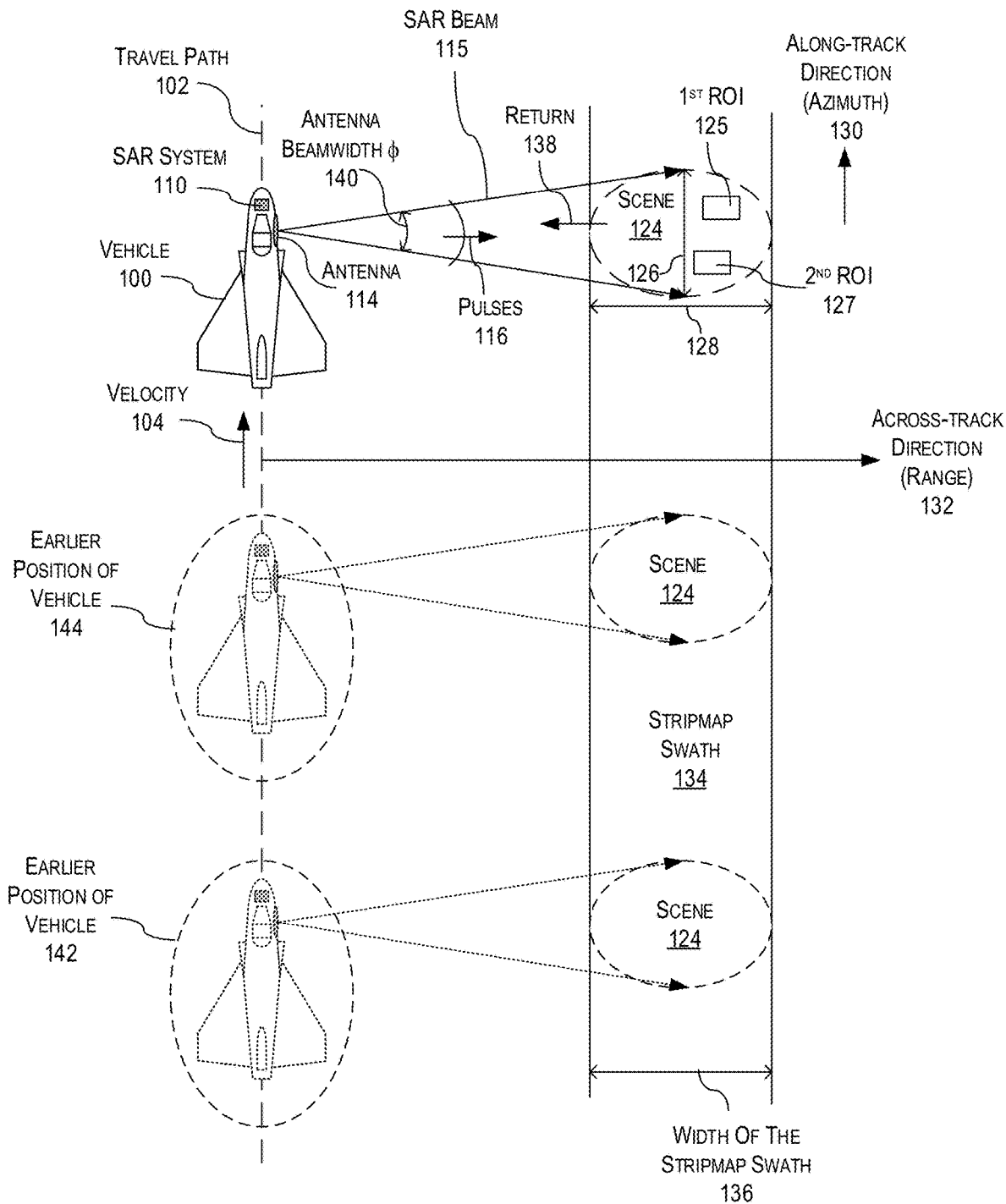
FIG. 1B is a top view of the SAR system in the vehicle shown in FIG. 1A in accordance with the subject disclosure.

In FIG. 1B, a top view of the SAR system 110 in the vehicle 100 is shown in accordance with the subject disclosure. Again, the vehicle 100 is shown flying along the straight travel path 102 with a constant velocity 104. In operation, as the vehicle 100 flies along the travel path 102, the SAR system 110, through the antenna 114, radiates, within a SAR beam 115, the SAR radar signal pulses 116 at the ground (e.g., landmass 108) at an approximately normal direction from the travel path 102 (and the along-track direction 130) where the SAR radar signal pulses 116 illuminate the scene 124 of the landmass 108 and scatter. The scatter off the scene 124 produces at least backscatter waves that are radar return signals 138 (i.e., backscattered return signals) that have reflected off the landmass 108 and reflected back towards the antenna 114. The antenna 114 receives the radar return signals 138 and passes them to the SAR system 110 that processes the radar return signals 138. In this example, the processing can include recording and storing the radar return signals 138 in a storage (not shown) in a data grid structure. The SAR system 110 utilizes consecutive time intervals of radar transmission and reception to receive radar phase history data of the illuminated and observed scene (e.g., scene 124) at different positions along the travel path 102. Normally, the processing the combination of raw radar data (e.g., radar phase history data of illuminated scene) enables the construction of a SAR image (e.g., a high-resolution SAR image) of the captured scene (e.g., scene 124). However, the disclosed SAR system 110 obviates the need for the construction of SAR images in order to perform a target recognition task, instead, the SAR system 110 computes the spatial-temporal features of targets with a RCNN network directly from the complex range profiles of the received phase history data for recognition of the targets.

In this example, the widths 126 and 128 of the main beam of the antenna 114 are related to the antenna beamwidth $\phi$ 140 of the main beam produced by the antenna 114. Additionally, in this example, the vehicle 100 is shown to have traveled along the travel path 102 scanning the stripmap swath 134 at different positions along the travel path 102, where, as an example, the SAR system 110 is shown to have scanned two earlier scenes 142 and 144 the stripmap swath 134 at two earlier positions 146 and 148 (FIG. 1B doesn't have positions 146 and 148) along the travel path 102.

It is appreciated by those of ordinary skill in the art that while the example vehicle 100 shown in FIGS. 1A and 1B is a manned aircraft, this is for illustrative purpose only and the vehicle 100 can also be an unmanned aircraft such as an unmanned aerial vehicle (UAV) or drone.

Figure 1C:
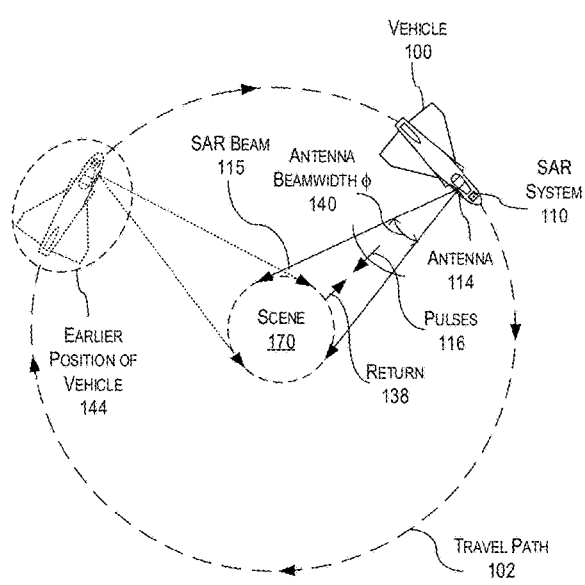
FIG. 1C is a top view of the SAR system operating in a circular mode in the vehicle shown in FIG. 1A in accordance with the subject disclosure.
Figure 1D:
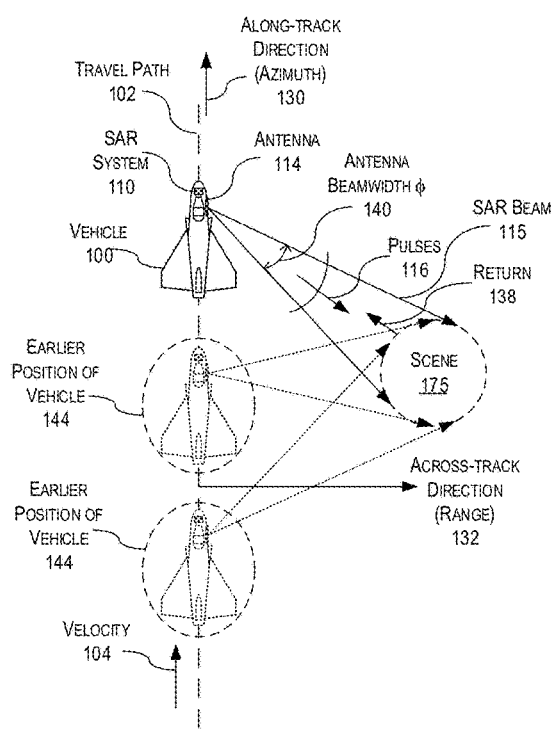
FIG. 1D is a top view of the SAR system operating in a spotlight mode in the vehicle shown in FIG. 1A in accordance with the subject disclosure.

In FIG. 1C, a top view of the SAR system 110 operating in a circular mode in the vehicle 100 is shown in accordance with the subject disclosure. In this example, the travel path 102 is a circular path and the SAR system 110 illuminates a circular scene 170. Turning to FIG. 1D, a top view of the SAR system 110 operating in a spotlight mode in the vehicle 100 is shown in accordance with the subject disclosure. In this example, the travel path 102 is straight similar to the example shown in FIG. 1A and the SAR system 110 illuminates another circular scene 175. It is appreciated by those of ordinary skill in the art that the scene 170 in FIG. 1C and scene 175 in FIG. 1D can each include one or more ROI, however, for the purpose of ease of illustration the one or more ROIs are not shown in these figures.

Figure 2:
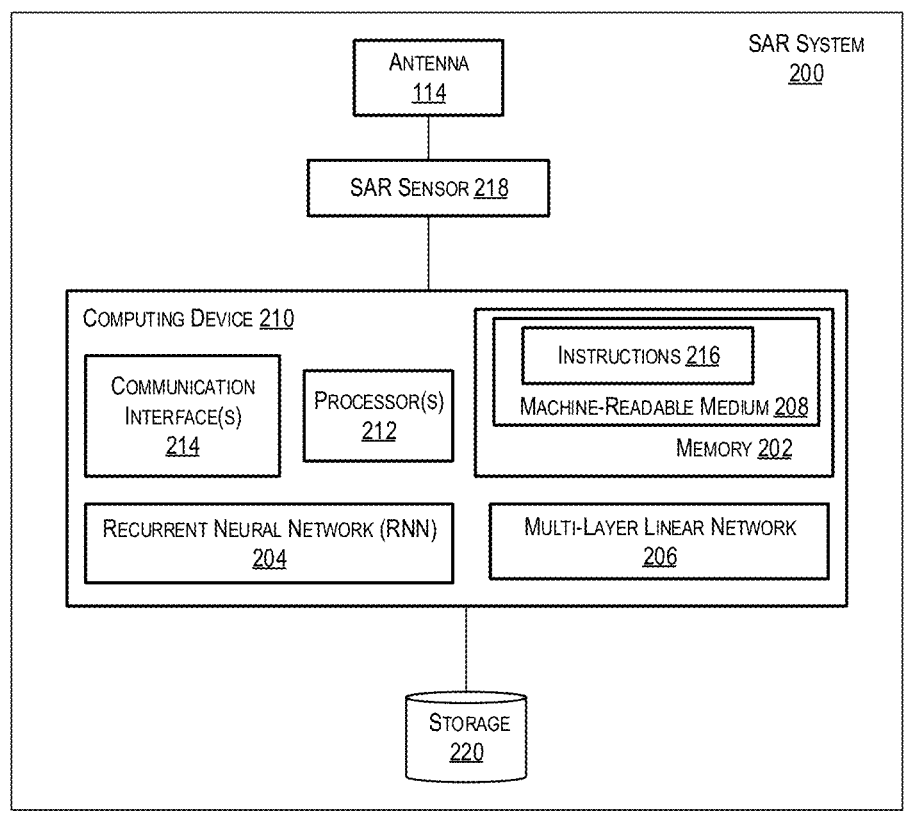
FIG. 2 is a system block diagram of an example of an implementation of the SAR system, shown in FIGS. 1A through 1D, in accordance with the subject disclosure.

In FIG. 2, a system block diagram of an example of an implementation of the SAR system 200 is shown in accordance with the subject disclosure. The SAR system 200 is substantially similar to SAR system 110 and can include functionality as more fully described herein, for example, as described above with regard to SAR system 110. The SAR system 200 can be part of a SAR automatic target recognition (ATR) system on the vehicle 100. In this example, the SAR system includes a memory 202, an RNN 204, a multi-layer linear network 206 in signal communication the RNN 204, and a machine-readable medium 208 on the memory 202.

Moreover, in this example, the memory 202, RNN 204, a multi-layer linear network 206 can be part of a computing device 210 that can also include one or more processors 212 and one or more communication interfaces 214. In this example, the RNN 204 and multi-layer linear network 206 can be implemented in hardware or software in the computing device 210 and can be controlled and/or implemented on the one or more processors 212 based on a predetermined design preference. The SAR system 200 can also include a SAR sensor 218 and storage 220.

The machine-readable medium 208 is configured to store instructions 216 that, when executed by the RNN, cause the SAR system to perform various operations. The various operations comprise: receiving with the combination of the antenna 114 and SAR sensor 218 raw SAR data associated with observed views of a scene (e.g., scene 124, 170, or 175), where the raw SAR data comprises information captured via the SAR system 110; radio frequency (RF) pre-processing the received raw SAR data to produce a processed raw SAR data; converting the processed raw SAR data to a complex SAR range profile data; processing the complex range profile data with the RNN 204 having RNN states; and mapping the RNN states to a target class with the multi-layer linear network 206.

In general, the SAR system 200 is utilized to capture and process phase history data from observation views, of the scene 124, 170, or 175 in the swath 134, in accordance with various techniques. The SAR system 200 is generally a SAR ATR or navigation guidance system that comprises a SAR radar device that transmits and receives electromagnetic radiation as RF signals and provides representative data in the form of raw SAR data such as SAR phase history data. As an example, the SAR system 200 is implemented to transmit and receive radar energy pulses in one or more frequency ranges from less than one gigahertz to greater than sixteen gigahertz based on a given application for the SAR system 200.

In this example, the computing device 210 includes the one or more processing units 212 that include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory 202 to execute instructions to perform any of the various operations described in the subject disclosure. The one or more processing units 212 are adapted to interface and communicate with the memory 202 and SAR sensor 218 via the one or more communication interfaces 214 to perform method and processing steps as described herein. The one or more communication interfaces 214 include wired or wireless communication buses within the vehicle 100.

In various examples, it is appreciated by those of ordinary skill in the art that the processing operations and/or instructions are integrated in software and/or hardware as part of the one or more processing units 212, or code (e.g., software or configuration data), which is stored in the memory 202. The examples of processing operations and/or instructions disclosed in the subject disclosure are stored by the machine-readable medium 208 in a non-transitory manner (e.g., a memory 202, a hard drive, a compact disk, a digital video disk, or a flash memory) to be executed by the one or more processing units 212 (e.g., a computer such as a logic or processor-based system) to perform various methods disclosed herein. In this example, the machine-readable medium 208 is shown as residing in memory 202 within the computing devices 210 but it is appreciated by those of ordinary skill that the machine-readable medium 208 can be located on other memory external to the computing device 210, such as for example, the storage 220. As another example, the machine-readable medium 208 can be included as part of the one or more processing units 212. It is also appreciated by those of ordinary skill in the art that the RNN 204 and multi-layer linear network 206 can be implemented by the one or more processors 212 running the instructions 216.

In this example, the memory 202 can include one or more memory devices (e.g., one or more memories) to store data and information. The one or more memory devices can include various types of memory including volatile and non-volatile memory devices, such as RAM (Random Access Memory), ROM (Read-Only Memory), EEPROM (Electrically-Erasable Read-Only Memory), flash memory, or other types of memory. The memory 202 can include one or more memory devices within the computing device 210 and/or one or more memory devices located external to the computing device 210. The one or more processing units 212 are adapted to execute software stored in the memory 202 to perform various methods, processes, and operations in a manner as described herein.

The SAR sensor 218 is utilized to transmit electromagnetic waves (e.g., SAR radar signal pulses 116) and receive backscattered waves (e.g., received phase history data from the radar return signals 138) of scene 124, 170, or 175. In this example, the SAR sensor 218 includes a radar transmitter to produce the SAR radar signal pulses 116 that are provided to the antenna 114 and radiated in space toward scene 124, 170, or 175 by antenna 114 as RF electromagnetic waves. The SAR sensor 218 further includes a radar receiver to receive backscattered waves (e.g., radar return signals 138) from antenna 114. The radar return signals 138 are received by SAR sensor 218 as raw SAR data of the received phase history data of the scene 124, 170, or 175. The SAR sensor 218 communicates the received phase history data to the one or more processing units 212 and/or memory 202 via the one or more communication interfaces 214.

The antenna 114 is implemented to both transmit the SAR radar signal pulses 116 and receive backscattered waves (e.g., radar return signals 138). In this example, the antenna 114 is in a fixed position on the vehicle 100 and is directed outward from the side of the vehicle 100 since the SAR system 200 is operating as a side-looking radar system. The antenna 114 can be implemented as phased-array antenna, horn type of antenna, parabolic antenna, or other type of antenna with high directivity.

The storage 220 can be a memory such as, for example, volatile and non-volatile memory devices, such as RAM, ROM, EEPROM, flash memory, or other types of memory, or a removable storage device such as, for example, hard drive, a compact disk, a digital video disk. The storage 220 can be utilized to store template range profile data of the scenes.

Figure 3:
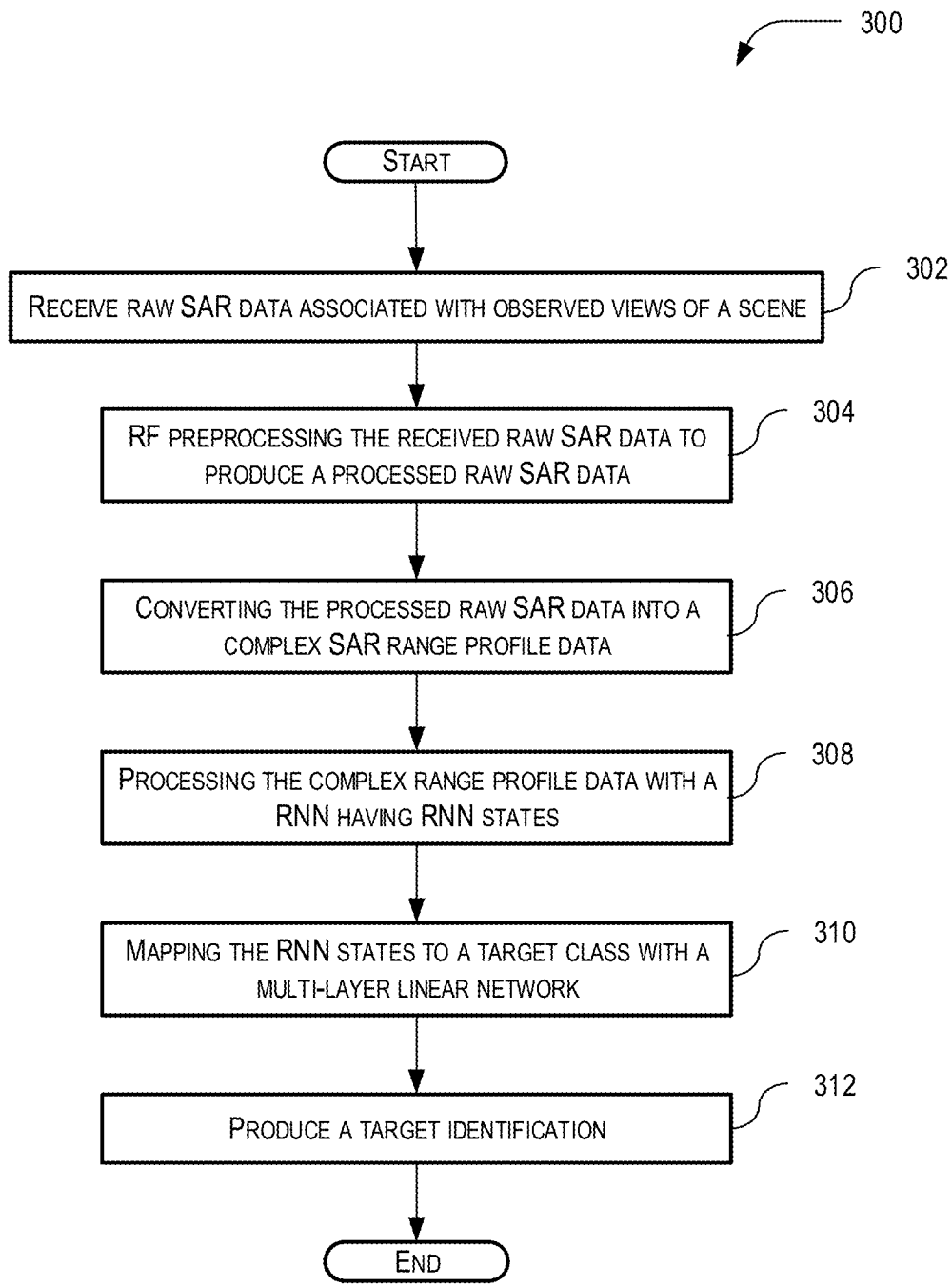
FIG. 3 is a flowchart of an example of an implementation of a method performed by the SAR system, shown in FIG. 2, in accordance with the subject disclosure.

In FIG. 3, a flowchart is shown of an example of an implementation of the method 300 performed by the SAR system 200 in accordance with the subject disclosure. The method 300 begins by receiving 302 the raw SAR data associated with the observed views of the scene 124, 170, or 175. The raw SAR data includes information captured via an ATR system having the SAR system 200. As discussed earlier, in operation, as the vehicle 100 flies along the travel path 102, the SAR system 200, through the antenna 114, radiates the SAR radar signal pulses 116 at the landmass 108 at an approximately normal direction from the travel path 102 and the along-track direction 130 where the SAR radar signal pulses 116 illuminate the scene 124, 170, or 175 of the landmass 108 and scatter. The scatter off the scene 124, 170, or 175 produces at least backscatter waves that are radar return signals 138 (i.e., backscattered return signals) that have reflected off the landmass 108 and reflected back towards the antenna 114. The antenna 114 receives the radar return signals 138 and passes them to the SAR system 200 that processes the radar return signals 138. In this example, the radar return signal 138 are the raw SAR data that is two-dimensional data that includes frequency band data and pulse domain data.

The method 300 then includes RF preprocessing 304 the received raw SAR data to produce a processed raw SAR data. It is appreciated by those of ordinary skill in the art that, in general, RF preprocessing 304 includes producing an in-phase component and a quadrature-phase component of the received raw SAR data that represent the real and imaginary parts of the processed raw SAR data, where the processed raw SAR data includes two-dimensional data that includes frequency band data and pulse domain data The method 300 then converts 306 the processed raw SAR data into a complex SAR range profile data. The processed raw SAR data can be converted into the complex SAR range profile data by applying a window function to the processed raw SAR data and then applying a Fourier transform to the pulse domain data within the processed raw SAR data. In this example, the window function can be, for example, Hanning window function and/or Hamming window function. Moreover, the Fourier transform can be performed by a fast Fourier transform.

The method 300 then processes 308 the complex range profile data with the RNN 204 having RNN states and mapping 310 the RNN states to a target class with the multi-layer linear network 206. The SAR system 200 produces 312 a target identification (ID) and the method 300 then ends.

Determine the Complex Range Profile

As described earlier, prior to determining the complex range profile—i.e., converting 306 the processed raw SAR data into the complex SAR range profile data, the received raw SAR data, which are RF pulses, need to be preprocessed for phase and/or frequency compensation in order to make the RF pulses of the raw SAR data useful. Once processed, the SAR system 200 then computes the complex range profile of the raw SAR data to produce the processed raw SAR data. Again, the input processed raw SAR data (i.e., RF phase history) is data that is organized as a two-dimensional array where one dimension is representative of the frequency bands and the other one dimension is representative of the RF pulses. The range profile of raw SAR data can be computed by applying one-dimensional Fourier transformation to the input RF pulses. For example, let PH(m, n) be a two-dimensional RF phase history array and the column represents the radar pulse domain, which means each column vector represents radar pulses collected at a specific time step. The SAR radar pulses can be extracted from the column vectors of PH(m, n), utilizing the relationship (1) $P_r$=PH(:, r). In this example, m represents frequency band values of a row vector $P_f$ of the frequency band data and n represents pulse domain values of the column vector $P_r$ of the pulse domain data.

A window function, such as Hanning or Hamming window, can be applied to the pulse vectors for reducing the boundary effect of the Fourier transformation. In this example, a windowed pulse vector is determined by the relationship (2) $P_w(i)=P_r(i)*w(i)$, where the vector w(i) is a window function vector, * is the Hadamard product operation, and i is the integer index representing a range bin from 0 to M, where M is a constant value that represents the maximal range bin that is determined by the number of sampling frequencies in the frequency band data. It is appreciated by those of ordinary skill in the art that a Hadamard product is a binary operation that takes two matrices of the same dimensions and produces another matrix of the same dimension as the operands, where each element i, j is the product of elements i, j of the original two matrices. Utilizing this approach, a range profile vector $rp_r(m)$ is determined by the relationship (3)

$$rp_r(m) = \sum_{k=0}^{M-1} P_w(k)e^{-j\frac{2\pi mk}{M}}.$$

In this example, after all of the column vectors $P_r$ in PH(m, n) are processed with relationships (1) to (3), a two-dimensional range profile, RP(m, n) is determined from the relationship (4) RP(m, n)=RP$[rp_r(m)]_{r=0}^{T-1}$ where one dimension (i.e., m) represents range bins and the other dimension (i.e., n) represents time-steps. In this example, the range-profile RP(m, n) is a complex value matrix and there are two ways to represent a complex value that include to utilize the real part and imaginary part or to use the amplitude and phase of the number. In this disclosure, the real and imaginary parts are utilized. In this example, it is appreciated that the complex matrix RP(m, n), m=0 to M−1; n=0 to T−1 representing M range bins=M sampling frequencies in the frequency band domain and T time-steps=T pulses in the pulse domain.

Process the Complex Range-Profile Data with a GRU Neural Network

In the fourth processing step 308, an RNN is utilized to process the complex SAR range profile data. It is appreciated by those of ordinary skill in the art that an RNN is a class of artificial neural networks having a plurality of nodes that are interconnected. The connections between the nodes form a directed graph along a temporal sequence. This allows an RNN to exhibit temporal dynamic behavior. Derived from feedforward neural networks. RNNs can use their internal state (memory) to process variable length sequences of inputs. Generally, these properties have allowed RNNs to be utilized fir tasks such as unsegmented, connected handwriting recognition or speech recognition. In general, RNNs include recurrent long-short term memory (LSTM) neural networks and the GRUNN. The GRUNN is computationally simpler than a LSTM neural network but has comparable classification capability. As such, for these examples, a GRUNN will be utilized as the RNN even though it is appreciated that LSTM neural network can also be utilized.

Figure 4A:
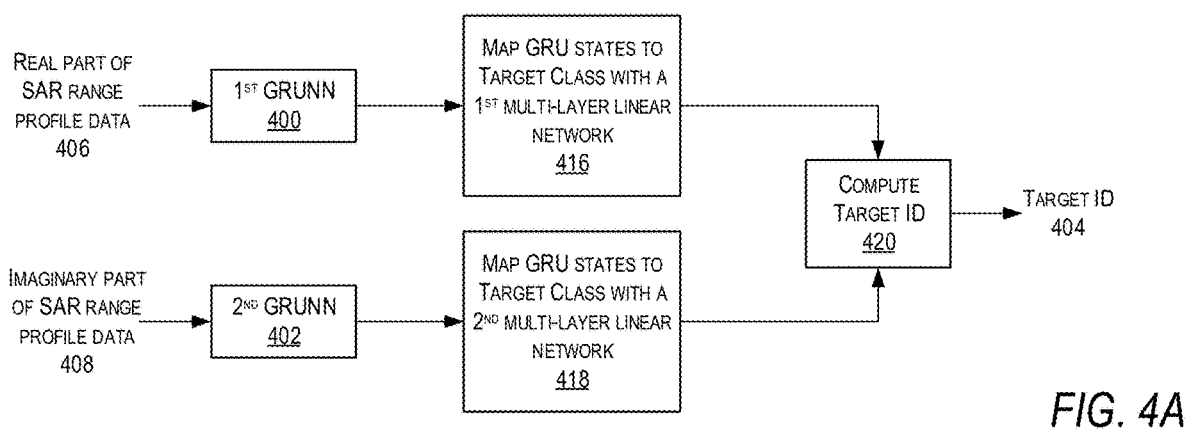
FIG. 4A is a system block diagram of an example of an implementation of a first gated recurrent unit (GRU) neural network (GRUNN) and second GRUNN utilized to compute a target identification (ID) from a complex SAR range profile data in accordance with the subject disclosure.

In FIG. 4A, a system block diagram of an example of an implementation of a first GRUNN 400 and second GRUNN 402 utilized to compute a target identification (ID) 404 from a complex SAR range profile data is shown in accordance with the subject disclosure. In this example, the complex SAR range profile data has been separated into a real part 406 of the SAR range profile data and an imaginary part 408 of the SAR range profile data. Similarly, in FIG. 4B, a system block diagram of an example of an implementation of a single GRUNN 410 utilized to compute the target ID 412 from the complex SAR range profile data 414 in accordance with the subject disclosure.

Figure 4B:
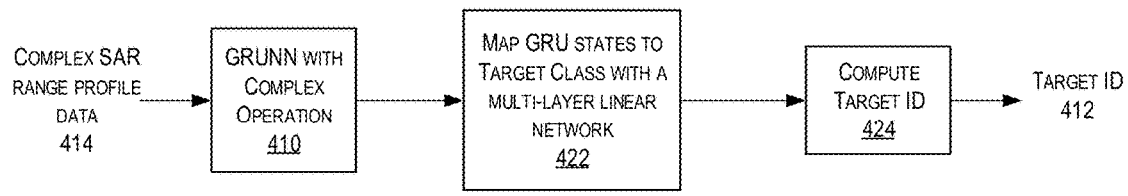
FIG. 4B is a system block diagram of an example of an implementation of a single GRUNN utilized to compute a target identification (ID) from the complex SAR range profile data in accordance with the subject disclosure.

In this example, to process the complex SAR range profile data 414, the two approaches shown in FIGS. 4A and 4B can be utilized (e.g., by the SAR system 200). The first approach is shown in FIG. 4A where the real part 406 and imaginary part 408 of complex SAR range-profile data are separately processed by the first GRUNN 400 and second GRUNN 402 and the second approach is to process the real and imaginary parts of the complex SAR range profile data 414 jointly in the single GRUNN 410 with complex operation as shown in FIG. 4B. In the separate processing scheme shown in FIG. 4A, the two GRUNNs (i.e., first GRUNN 400 and second GRUNN 402) each act as separate channels.

In the first example, the first GRUNN 400 receives the real part 406 of the SAR range profile data and process it produce a plurality of first GRUNN states with the first GUNN 400 that are mapped to a target class for the real part 406 of the SAR range profile data with a first multi-layer linear network 416. The second GRUNN 402 receives the imaginary part 408 of the SAR range profile data and process it produce a plurality of second GRUNN states with the second GUNN 402 that are mapped to a target class for the imaginary part 408 of the SAR range profile data with a second multi-layer linear network 418. The mapped first target class and second target class are combined to compute 420 the target ID 404.

In the second example, the single GRUNN 410 receives the complex SAR range profile data 414 and jointly processes the real and imagery parts of the complex SAR range profile data 414 to produce a plurality of GRUNN states that are mapped to a target class for the both the real and imaginary parts of the complex SAR range profile data 414 with a joint multi-layer linear network 422. The mapped joint real and imaginary target classes are utilized to compute 424 the target ID 412.

In operation, the process of training the GRUNNs shown in FIG. 4A, both the first GRUNN 400 and second GRUNN 402 are controlled by a single objective function; therefore, both the first GRUNN 400 and second GRUNN 402 are trained by one optimization process that includes the single objective function. In the joint processing method shown in FIG. 4B, both the real part and imaginary part of the complex SAR range profile data 414 are processed by the single GRUNN 410, which uses complex operations in its GRU processing cells.

Figure 5:
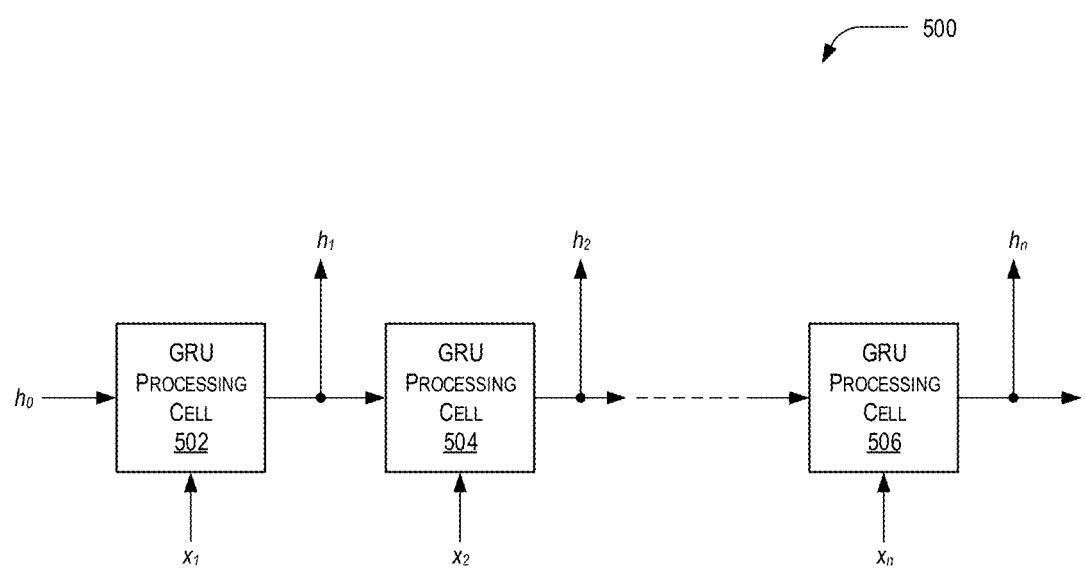
FIG. 5 is a system block diagram of an example of an implementation of GRUNN in accordance with the subject disclosure.

In FIG. 5, a system block diagram of an example of an implementation of GRUNN 500 is shown in accordance with the subject disclosure. In this example, the GRUNN 500 is shown including a set of GRU processing cells that include n GRU processing cells that for purposes of illustration are a first GRU processing cell 502, second GRU processing cell 504, and $n^{th}$ first GRU processing cell 506. The inputs to each of the GRU processing cells 502, 504, and 506 include a temporal sequence $x_t$ and the outputs of the GRU processing cells are the states of GRU processing cells (i.e., the GRUNN states) $h_0$, $h_1$, $h_2$, etc.

Since each GRU processing cell 502, 504, and 506 obtains input information from the previous state variable (past time GRUNN states) of the GRUNN 500 and the current input sequence (current input values $x_t$), the GRU network has the capability to learn the temporal patterns from input temporal sequences $x_t$. For the SAR range-profile data, at a specific time, a range-profile vector represents the range-distribution in the spatial domain. Therefore, the GRUNN can learn the spatial-temporal patterns from SAR range-profile data.

Figure 6:
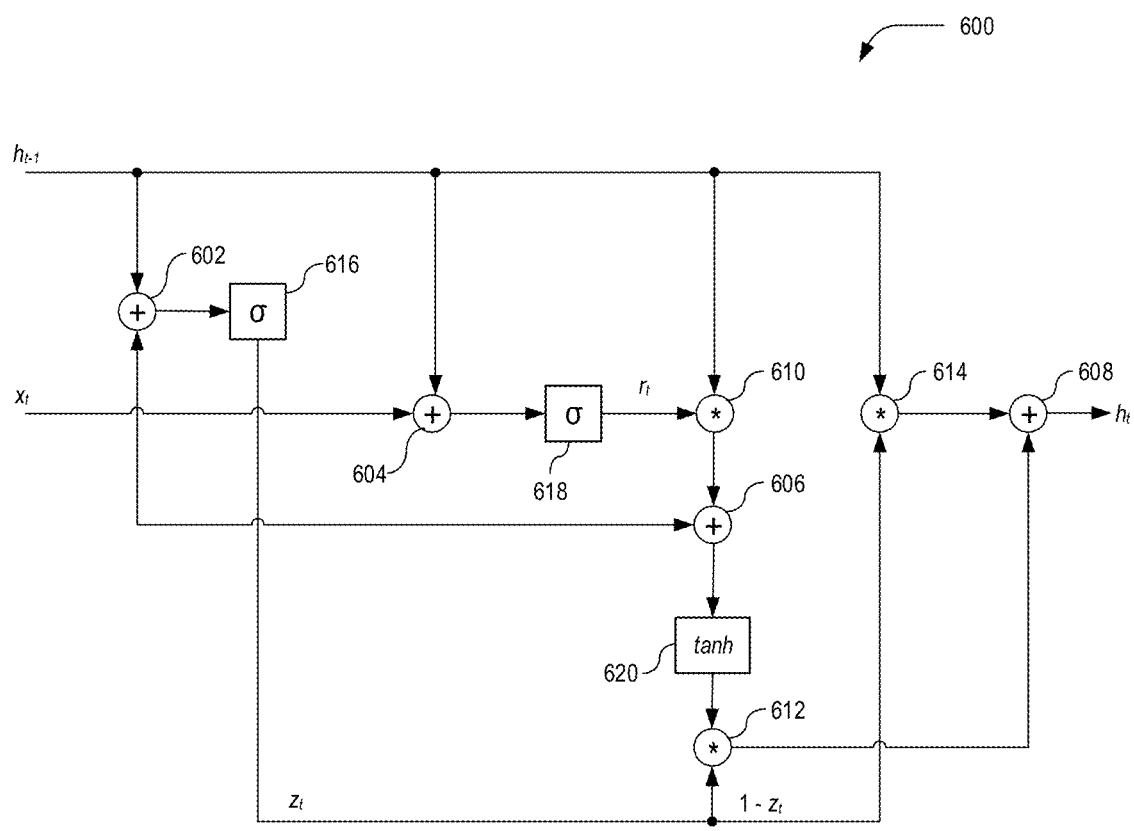
FIG. 6 is a system block diagram of an example of an implementation of a GRU processing cell of the GRUNN shown in FIG. 5 in accordance with the subject disclosure.

FIG. 6 is a system block diagram of an example of an implementation of a GRU processing cell 600 of the GRUNN 500 is shown in accordance with the subject disclosure. In this example, the GRU processing cell 600 includes a first adder 602, second adder 604, third adder 606, a fourth adder 608, a first Hadamard product operator 610, second Hadamard product operator 612, third Hadamard product operator 614, a first gate function 616, second gate function 618, and a hyperbolic tangent function 620. The operation of the GRU processing cell 600 can be mathematically described by a set of equations given as follows:

$$z_t = \sigma(W_z x_t + U_z h_{t-1} + b_z); \quad (4)$$

$$r_t = \sigma(W_r x_t + U_r h_{t-1} + b_r); \text{ and} \quad (5)$$

$$h_t = (1-z_t)*h_{t-1} + z_t * \tanh[W_h x_t + U_h(r_t * h_{t-1}) + b_h], \quad (6)$$

where the gate function $\sigma(x)$ is a logistic sigmoid function defined by the relationship $$\sigma(x) = \frac{1}{1+e^{-x}}. \quad (7)$$

The gate function tan h(x) is a hyperbolic tangent function defined by the relationship $$\tanh(g) = \frac{e^x - e^{-x}}{e^x + e^{-x}}. \quad (8)$$

In these relationships, $z_t$ is the updated gate variable of the GRU processing cell, $r_t$ is the reset gate variable, and $h_t$ is the state variable. The network parameters, $W_z$, $U_z$, $b_z$, $W_r$, $U_r$, $b_r$, $U_h$, and $b_h$ are learned from a learning process performed by the GRU processing cell. Again, the state variable, $h_t$, is the output variable of the GRU processing cell and the notation * is the Hadamard product operation. In a complex GRU processing cell, if implemented as shown in FIG. 4B, all the operations, multiplication, addition and the Hadamard product are complex operations and the gate functions are applied to the real part and imaginary part of the complex variables separately.

The states of the GRUNN 500 are high-dimensional vectors, which contain the spatial-temporal correlations of the input temporal sequences $x_t$. In general, a readout neural network is needed to map the high-dimensional network state variables into the vectors in the application domain. In this example, the GRUNN 500 utilizes the multi-layer linear network 416, 418, or 422 to map the high-dimensional network state variables into target class vectors.

Mapping GRUNN States to Target Class

In the fifth processing step 310, FIG. 3, a two-layer feed-forward neural network is used to map the GRUNN 500 states into class vectors $Y_C$. In this example, H is defined as a GRUNN state vector and $Y_C$ is defined by the relationship (9)

$$Y_C = \sigma(V_2 \sigma(V_1 H + b_1) + b_2),$$

where the parameters, $V_1$, $V_2$, $b_1$, and $b_2$, are determined by a network training process and the magnitude $Y_C$ is used for representing a class ID vector, which is a real value vector. The class ID vector is defined by the relationship (10)

$$Y_{cm} = [\|y_c^1\|, \ldots \|y_c^m\|],$$

where the variable $y_c^i$ is a complex component of $Y_C$. The objective function (Obj) for training the GRUNN 500 is a real valued function defined by the relationship (11)

$$Obj = \frac{1}{N} \sum_i \|Y_{cm}(i) - Y_{th}(i)\|,$$

where the constant N is equal to the number of training data and the vector $Y_{th}(i)$ is the labeled data.

In this example, the training process includes initially setting all of the parameters of the GRUNN 500 to a random value uniformly distributed in the range of −1.0 to 1.0. The parameters or the GRUNN 500 are then updated by a gradient descent technique that is defined by the relationships $$W_z(t) = W_z(t-1) - \alpha \frac{\partial Obj}{\partial W_z}, \quad (19)$$

$$U_z(t) = U_z(t-1) - \alpha \frac{\partial Obj}{\partial U_z}, \quad (20)$$

$$W_r(t) = W_r(t-1) - \alpha \frac{\partial Obj}{\partial W_r}, \quad (21)$$

$$U_r(t) = U_r(t-1) - \alpha \frac{\partial Obj}{\partial U_r}, \quad (22)$$

$$W_h(t) = W_h(t-1) - \alpha \frac{\partial Obj}{\partial W_h}, \quad (23)$$

$$U_h(t) = U_h(t-1) - \alpha \frac{\partial Obj}{\partial U_h}, \quad (24)$$

$$V_1(t) = V_1(t-1) - \alpha \frac{\partial Obj}{\partial V_1}, \text{ and} \quad (25)$$

$$V_2(t) = V_2(t-1) - \alpha \frac{\partial Obj}{\partial V_2}, \quad (26)$$

where $\alpha$ is a learning rate. In this example, all of the derivatives from the relationships are calculated by an algorithm of back-propagation through time (BPTT) described in Paul J. Webos, "Backpropagation Through Time: What is does and How to do it," Proceedings of the IEEE, Vol. 78, No. 10, pp. 1550-1560, 1990, which is herein incorporated by reference in its entirety. Moreover, in this example, for a complex variable, $W = W_r + jW_i$, the partial derivative of the complex variable is given by the relationship $$\frac{\partial Obj}{\partial W} = \frac{\partial Obj}{\partial W_r} + j \frac{\partial Obj}{\partial W_i}. \quad (27)$$

As an example of operation, the SAR system 200 was implemented and complex images test images from the Moving and Stationary Target Acquisition and Recognition (MSTAR) public data provided by DARPA/U.S. Air Force Research Laboratory where utilized to produce pseudo phase-history data and complex SAR range profile data that was processed by the SAR system 200.

Figure 7A:
FIG. 7A is an example of a sample of range profile data for use with the SAR system, shown in FIG. 2, in accordance with the subject disclosure.
Figure 7B:
FIG. 7B is example of another sample of range profile data for use with the SAR system, shown in FIG. 2, in accordance with the subject disclosure.
Figure 7C:
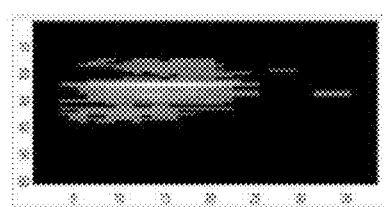
FIG. 7C is example of yet another sample of range profile data for use with the SAR system, shown in FIG. 2, in accordance with the subject disclosure.

Turning to FIGS. 7A-7C, examples of three samples of amplitudes of complex range-profile data produced from the MSTAR public data are shown in accordance with the subject disclosure. These samples are from three targets referred to as BMP2, M2, and T72 that are respectively shown in FIGS. 7A, 7B, and 7C. In this example, each complex SAR range-profile data sequence converts one degree of target view and FIGS. 7A-7C presents some samples of the resulting SAR range profile data. Each range-profile data was scaled to a two-dimensional array with a size of 40 range bins by 60 time-steps. In this example, the SAR system 200 has 2400 SAR complex range-profile data sequences in the training data set and 450 complex range-profile data sequences in the testing data set.

To evaluate the benefits of utilizing the complex SAR range profile data for ATR, the SAR system 200 is implemented to test three processing methods that include: 1) processing only real SAR range-profile data (i.e., one GRUNN with real operations); 2) processing the real part and imaginary part of complex SAR range-profile data separately (i.e., utilizing the two GRUNN 400 and 402 with real operations); and 3) processing the real part and imaginary part jointly of complex SAR range-profile data (i.e., the single GRUNN 422 with complex operations).

In this example, in implementing the GRUNN, each GRUNN uses 60 GRU processing cells and each GRU processing cell uses 80 internal states. For the two-layer mapping network described by the relationship defining the class vector $Y_C$, the first layer uses 80 neurons and the second layer uses 3 neurons, which are for the three-target tanks. In the training process, all testing networks are trained with 25 epochs and a learning rate of 0.0001. In the first processing method, a GRUNN with real operations is used to process the real SAR range-profile of our test data. The classification result on the testing data is shown in Table 1.

TABLE 1

Classification Result of Processing Real Range Profile Data

|  |  | True Class | | |
| --- | --- | --- | --- | --- |
|  |  | BMP2 | M2 | T72 |
| Computed Class | BMP2 | 0.8417 | 0.0863 | 0.0720 |
|  | M2 | 0.1212 | 0.7758 | 0.1030 |
|  | T72 | 0.0890 | 0.0685 | 0.8425 |
| Average Rate |  | 82% | | |

In this example, the GRUNN produces a reasonably good result with an average classification rate that is greater than 82%. This means the amplitude of SAR range-profile data carries the most information about the targets.

In the second processing method, the real part and imaginary part of the complex range-profile data are processed separately in the first GRUNN 400 and the second GRUNN 402 as shown in FIG. 4A. Since only one objective function (as defined in relationship 11) is used for training the network, both the first GRUNN 400 and the second GRUNN 402 in FIG. 4A are jointly optimized to learn the weights of the network. Each GRU network (i.e., first GRUNN 400 and the second GRUNN 402) in FIG. 4A uses real value operations to process the real part and imaginary part of the complex range-profile data. The classification result from separately processing the real part and imaginary part of the complex SAR range-profile data is shown in Table 2.

TABLE 2

Classification Result of Separate Processing Real and Imaginary Data

|  |  | True Class | | |
| --- | --- | --- | --- | --- |
|  |  | BMP2 | M2 | T72 |
| Computed Class | BMP2 | 0.9286 | 0.0454 | 0.0260 |
|  | M2 | 0.0288 | 0.9424 | 0.0288 |
|  | T72 | 0.0191 | 0.0764 | 0.9045 |
| Average Rate |  | 93.18% | | |

From these results it is appreciated that the separate GRUNN 400 and GRUNN 402 produces a better result with an average classification rate of greater than 90% compared to the GRUNN that only processes real range-profile data shown in Table 1. This result shows that the phase information of complex SAR range-profile data is helpful for target recognition. In the last processing method, the single complex GRUNN 422 in FIG. 4B is used to process the complex SAR range profile data. The classification result produced by the single complex GRUNN 422 is shown in Table 3. In this example, the single complex GRUNN 422 produces a slightly better result than the one produced by the separate GRUNN 400 and GRUNN 402. However, the separate processing network utilizing GRUNN 400 and GRUNN 402 is computationally simpler than the single complex GRUNN 422 since the separate processing network (utilizing GRUNN 400 and GRUNN 402) uses real number operations. To complete a complex multiplication in the single complex GRUNN 422 requires completing four real-number multiplications. The separate processing network utilizing GRUNN 400 and GRUNN 402 only needs to perform two real-number multiplications for processing a multiplication of two complex numbers due to its two-channel real-number operations.

TABLE 3

Classification Result of Separate Processing Real and Imaginary Data

|  |  | True Class | | |
| --- | --- | --- | --- | --- |
|  |  | BMP2 | M2 | T72 |
| Computed Class | BMP2 | 0.8916 | 0.0602 | 0.0482 |
|  | M2 | 0.0 | 0.9710 | 0.0290 |
|  | T72 | 0.0137 | 0.0411 | 0.9452 |
| Average Rate |  | 93.60% | | |

In this example, three different processing methods were testes with predetermined training and testing data sets. The average classification accuracy of the three different processing methods on the same testing data set is summarized as follows: the processing of only real data had an average classification rate of 82.00%; the processing of the real and imaginary data separately had an average classification rate of 93.16%; and the processing of real and imaginary data jointly has an average classification rate of 93.60%.

These results show that the method of processing the real amplitude data produces the poorest result and the method of using the complex GRUNN to process the complex data generates the best result. Moreover, the results also show that the phase information of complex SAR range profile data is helpful for target recognition and both the joint processing (complex GRUNN) and separate processing complex SAR range profile data via GRUNN 400 and GRUNN 402 can achieve comparable classification results.

In summary, the SAR system 200 is a SAR target recognition system that can identify different targets/objects without the use of SAR images. The SAR system 200 uses SAR range profile data to identify targets, which is computationally efficient and can enable real-time SAR target recognition from streaming raw SAR data. The proposed system is an extension of a previous invention of range profile SAR based ATR. In this example, the SAR system 200 utilizes complex SAR range profile data and a complex GRUNN to achieve ATR capability. The SAR system 200 is effective to improve target classification with complex SAR range profile data and a complex GRUNN.

Further, the disclosure comprises embodiments according to the following clauses.

Clause 1. A method, comprising: receiving raw synthetic aperture radar (SAR) data associated with observed views of a scene, wherein the raw SAR data comprises information captured via an automatic target recognition (ATR) system having a SAR system; radio frequency (RF) preprocessing the received raw SAR data to produce a processed raw SAR data; converting the processed raw SAR data to a complex SAR range profile data; processing the complex SAR range profile data with a recurrent neural network (RNN) having RNN states; and mapping the RNN states to a target class with a multi-layer linear network.

Clause 2. The method of clause 1, wherein the RF preprocessing the received raw SAR data includes producing an in-phase component of the received raw SAR data and a quadrature-phase component of the received raw SAR data.

Clause 3. The method of clause 1 or 2, wherein the processed raw SAR data includes two-dimensional data that includes frequency band data and pulse domain data, and converting the processed raw SAR data comprises applying a Fourier transform to the pulse domain data to produce the complex SAR range profile data.

Clause 4. The method of clause 3, wherein the Fourier transform is a fast Fourier transform.

Clause 5. The method of clause 3, 4, or 5, wherein converting the processed raw SAR data further comprises applying a window function prior to applying the Fourier transform to the pulse domain data, and wherein the window function includes a Hanning window function and a Hamming window function.

Clause 6. The method of clause 3, 4, or 5, wherein the processed raw SAR data is represented by a two-dimensional array represented by PH(m, n), wherein m represents frequency band values of a row vector $P_f$ of the frequency band data and n represents pulse domain values of a column vector $P_r$ of the pulse domain data, and applying the window function includes determining a windowed pulse vector $P_w$ using a relationship $P_w(i)$ equals $P_r(i)$ combined with $w(i)$ via a Hadamard product operation, wherein $w(i)$ is window function vector and i represents a range from zero to M, wherein M is a constant value that represents a number of sampling frequencies in the frequency band data, determining a range profile vector $rp_r(m)$ defined by a relationship defined as $$rp_r(m) = \sum_{k=0}^{M-1} P_w(k) e^{-j\frac{2\pi mk}{M}},$$

and determining a two-dimensional range profile RP(o, p) that is equal to $RP[rp_r(o)]_{r=0}^{T-1}$, wherein o represents one-dimensional range bins of the two-dimensional range profile RP(o, p) and p represents one-dimensional time-steps of the two-dimensional range profile.

Clause 7. The method of clause 1, 2, 3, 4, 5, or 6, wherein the complex SAR range profile data includes an in-phase component of the complex SAR range profile data and a quadrature-phase component of the complex SAR range profile data, wherein the processing the complex SAR range profile data with the RNN includes processing the in-phase component of the complex SAR range profile data with a first gated recurrent unit (GRU) neural network (GRUNN) having first GRUNN states and processing the quadrature-phase component of the complex SAR range profile data with a second GRUNN having second GRUNN states, and wherein the mapping the RNN states to the target class includes mapping the first GRUNN states to a first target sub-class and mapping the second GRUNN states to a second target sub-class and determining a target identification from the mapped first target sub-class and the mapped second target sub-class.

Clause 8. The method of clause 6, wherein the complex SAR range profile data includes an in-phase component of the complex SAR range profile data and a quadrature component of the complex range profile data, the processing the complex SAR range profile data with the RNN includes processing both the in-phase component of the complex SAR range profile data and quadrature component of the complex SAR range profile data with a gated recurrent unit (GRU) neural network (GRUNN) having GRUNN states, and the mapping the RNN states to the target class includes mapping the GRUNN states to the target class, and the method further comprises determining a target identification from the mapped target class.

Clause 9. The method of clause 8, wherein the processing both the in-phase component of the complex SAR range profile data and quadrature-phase component of the complex SAR range profile data with the GRUNN includes processing the in-phase component of the complex SAR range profile data and quadrature-phase component of the complex SAR range profile data with a plurality of GRU processing cells within the GRUNN utilizing complex operations within each of the plurality of GRU processing cells, wherein the plurality of GRU processing cells are sequentially connected to each other and each of the plurality of GRU processing cells has a GRU processing cell input that is a temporal sequence $x_t$ and a GRU processing cell output $h_t$ that is a GRUNN state of the GRUNN states.

Clause 10. The method of clause 9, wherein each of the plurality of GRU processing cells performs a sub-method that includes receiving $x_t$ and a previous GRU processing cell output $h_{t-1}$, and producing an updated gate variable $z_t$ and a reset gate variable $r_t$, wherein the GRU processing cell output $h_t$ is a state variable, wherein $z_t$ is produced by a first gate function of a first combination of a first product of a first network parameter $W_z$ and $x_t$, a second product of a second network variable $U_z$ and $h_{t-1}$, and a third network parameter $b_z$, $r_t$ is produced by the first gate function of a second combination of a third product of a fourth network parameter $W_r$ and $x_t$, a fourth product of a fifth network variable $U_r$ and $h_{t-1}$, and a sixth network parameter $b_r$, and $h_t$ is produced by a relationship defined as $h_t=(1-z_t)*h_{t-1}+z_t*\tan h[W_h x_t+U_h(r_t*h_{t-1})+b_h]$, wherein $W_h$ is a seventh network parameter, $U_h$ is an eighth network parameter, and $b_h$ is a ninth network parameter, wherein the first gate function is a logistic sigmoid function as a function of d defined by $$\frac{1}{1+e^{-d}}$$

and tan h is a second gate function that is a hyperbolic tangent function as a function of g defined as $$\tanh(g) = \frac{e^g - e^{-g}}{e^g + e^{-g}},$$

and wherein * is the Hadamard product operation.

Clause 11. The method of clause 10, wherein the $W_z$, $U_z$, $b_z$, $W_r$, $U_r$, $b_r$, $W_h$, $U_h$, and $b_n$ are learned from a learn process performed by the GRU processing cell.

Clause 12. The method of clause 11, wherein the first gate function and the second gate function are applied to the in-phase component of the complex SAR range profile data separately from the quadrature component of the complex range profile data.

Clause 13. The method of clause 10, wherein the mapping the RNN states to the target class with the multi-layer linear network includes utilizing a two-layer feed-forward neural network, as the multi-layer linear network, to map the GRUNN states to a plurality of class vectors, wherein a class vector $Y_c$, of the plurality of class vectors, is related to a GRUNN vector H, a tenth network parameter $V_1$, eleventh network parameter $V_2$, a twelfth network parameter $b_1$, and a thirteenth network parameter $b_2$, wherein $Y_c$ is defined utilizing a relationship defined as $Y_C=\sigma(V_2\sigma(V_1H+b_1)+b_2)$, wherein $\sigma(d)$ is the first gate function and is a logistic sigmoid function as a function of d, and wherein $V_1$, $V_2$, $b_1$, and $b_2$ are determined by a network training process.

Clause 14. The method of clause 13, wherein the determining the target identification from the mapped target class includes determining a magnitude of $Y_c$ to represent a class identification vector $Y_{cm}$ that is defined as $Y_{cm}=[\|y_c^1\|, \ldots \|y_c^m\|]$, where $y_c^i$ is a complex component of $Y_c$.

Clause 15. The method of clause 14, wherein an objective function Obj for training the GRUNN is defined as $$Obj = \frac{1}{N}\Sigma_i \|Y_{cm}(i) - Y_{th}(i)\|,$$

wherein N is a constant that is equal to a total quantity of training data and $Y_{th}(i)$ is a labeled data, wherein mapping the RNN states to the target class further includes randomly initializing each network parameter $W_z$, $U_z$, $b_z$, $W_r$, $U_r$, $b_r$, $W_h$, $U_h$, $b_n$, $V_1$, $V_2$, $b_1$, and $b_2$ to an initialization value that is uniformly distributed between a range of −1.0 to 1.0, and wherein the network parameters are updated by relationships $$W_z(t) = W_z(t-1) - \alpha\frac{\partial Obj}{\partial W_z}, U_z(t) = U_z(t-1) - \alpha\frac{\partial Obj}{\partial U_z},$$

-continued $$W_r(t) = W_r(t-1) - \alpha\frac{\partial Obj}{\partial W_r}, U_r(t) = U_r(t-1) - \alpha\frac{\partial Obj}{\partial U_r},$$

$$W_h(t) = W_h(t-1) - \alpha\frac{\partial Obj}{\partial W_h}, U_h(t) = U_h(t-1) - \alpha\frac{\partial Obj}{\partial U_h},$$

$$V_1(t) = V_1(t-1) - \alpha\frac{\partial Obj}{\partial V_1}, \text{ and } V_2(t) = V_2(t-1) - \alpha\frac{\partial Obj}{\partial V_2},$$

where α is a learning rate.

Clause 16. An automatic target recognition (ATR) system having a synthetic aperture radar (SAR) configured to perform the method of claim 1, the ATR system comprising: a memory comprising a plurality of executable instructions and adapted to store template range profile data; the SAR system; and one or more processors configured as the RNN and the multi-layer linear network for executing the plurality of instructions to perform the method of clause 1.

Clause 17. A synthetic aperture radar (SAR) system for target recognition with complex range profile, the SAR system comprising: a memory; a recurrent neural network (RNN); a multi-layer linear network in signal communication the recurrent neural network; a machine-readable medium on the memory, the machine-readable medium storing instructions that, when executed by the RNN, cause the SAR system to perform operations comprising: receiving raw SAR data associated with observed views of a scene, wherein the raw SAR data comprises information captured via the SAR system; radio frequency (RF) preprocessing the received raw SAR data to produce a processed raw SAR data; converting the processed raw SAR data to a complex SAR range profile data; processing the complex SAR range profile data with the RNN having RNN states; and mapping the RNN states to a target class with the multi-layer linear network.

Clause 18. The SAR system of clause 17, wherein the RNN and the multi-layer linear network are configured on one or more processors.

Clause 19. The SAR system of clause 17, wherein the complex SAR range profile data includes an in-phase component of the complex SAR range profile data and a quadrature component of the complex range profile data, the processing the complex SAR range profile data with the RNN includes processing the complex SAR range profile data with gated recurrent unit (GRU) neural network (GRUNN) having GRUNN states that includes processing both the in-phase component of the complex SAR range profile data and quadrature component of the complex SAR range profile data with a plurality of GRU processing cells within the GRUNN utilizing complex operations within each of the plurality of GRU processing cells, and the plurality of GRU processing cells are sequentially connected to each other and each of the plurality of GRU processing cells has a GRU processing cell input that is a temporal sequence $x_t$ and a GRU processing cell output $h_t$ that is a GRUNN state of the GRUNN states.

Clause 20. The SAR system of clause 19, wherein each of the plurality of GRU processing cells performs a sub-method that includes receiving $x_t$ and a previous GRU processing cell output $h_{t-1}$ and producing an updated gate variable $z_t$ and a reset gate variable $r_t$, wherein the GRU processing cell output $h_t$ is a state variable, wherein $z_t$ is produced by a first gate function of a first combination of a first product of a first network parameter $W_z$ and $x_t$, a second product of a second network variable $U_z$ and $h_{t-1}$, and a third network parameter $b_z$, $r_t$ is produced by the first gate function of a second combination of a third product of a fourth network parameter $W_r$ and $x_t$, a fourth product of a fifth network variable $U_r$ and $h_{t-1}$, and a sixth network parameter $b_r$, and $h_t$ is produced by a relationship defined as $$h_t=(1-z_t)*h_{t-1}+z_t*\tan h[W_h x_t+U_h(r_t*h_{t-1})+b_h],$$

wherein $W_h$ is a seventh network parameter, $U_n$ is an eighth network parameter, and $b_h$ is a ninth network parameter, wherein the first gate function is a logistic sigmoid function as a function of d defined by $$\frac{1}{1+e^{-d}}$$

and tan h is a second gate function that is a hyperbolic tangent function as a function of g defined as $$\tanh(g) = \frac{e^g - e^{-g}}{e^g + e^{-g}},$$

and wherein * is a Hadamard product operation.

Clause 21. The SAR system of clause 20, wherein the $W_z$, $U_z$, $b_z$, $W_r$, $U_r$, $b_r$, $W_h$, $U_h$, and $b_n$ are learned from a learn process performed by the GRU processing cell.

It will be understood that various aspects or details of the disclosure can be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or can be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Moreover, the operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable medium that, when executed by one or more processing units, enable the one or more processing units to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

The invention claimed is:

1. A method, comprising:
    receiving raw synthetic aperture radar (SAR) data associated with observed views of a scene, wherein the raw SAR data comprises information captured via an automatic target recognition (ATR) system having a SAR system;
    radio frequency (RF) preprocessing the received raw SAR data to produce a processed raw SAR data which includes two-dimensional data that includes frequency band data and pulse domain data;
    converting the processed raw SAR data to a complex SAR range profile data;
    processing the complex SAR range profile data with a recurrent neural network (RNN) having RNN states; and
    mapping the RNN states to a target class with a multi-layer linear network;
    wherein the processed raw SAR data is represented by a two-dimensional array represented by PH(m,n), wherein m represents frequency band values of a row vector $P_f$ of the frequency band data and n represents pulse domain values of a column vector $P_r$ of the pulse domain data; and
    wherein converting the processed raw SAR data to the complex SAR range profile data comprises:
        determining a range profile vector $rp_r(m)$ defined by a relationship defined as $$rp_r(m) = \Sigma_{k=0}^{M-1} P_w(k) e^{-j\frac{2\pi mk}{M}},$$

where:

$P_w(k)$ is derived from $P_r(i)=PH(i,r)$,

M represents a maximal range bin that is determined by a number of sampling frequencies in the frequency band data; and m represents range bins;

wherein the complex SAR range profile data is obtained based on the range profile vector $rp_r(m)$.

2. The method of claim 1, wherein the RF preprocessing the received raw SAR data includes producing an in-phase component of the received raw SAR data and a quadrature-phase component of the received raw SAR data.

3. The method of claim 1, wherein:

$P_w(k)=P_r(k)*w(k)$, where $w(k)$ is a window function, and * is a Hadamard product operation.

4. The method of claim 3, wherein the window function is a Hanning window function.

5. The method of claim 3, wherein the window function is a Hamming window function.

6. The method of claim 1, wherein the SAR system provides a target identification.

7. The method of claim 1, wherein the complex SAR range profile data includes an in-phase component of the complex SAR range profile data and a quadrature-phase component of the complex SAR range profile data, wherein the processing the complex SAR range profile data with the RNN includes processing the in-phase component of the complex SAR range profile data with a first gated recurrent unit (GRU) neural network (GRUNN) having first GRUNN states and processing the quadrature-phase component of the complex SAR range profile data with a second GRUNN having second GRUNN states, and wherein the mapping the RNN states to the target class includes:

mapping the first GRUNN states to a first target sub-class and mapping the second GRUNN states to a second target sub-class and determining a target identification from the mapped first target sub-class and the mapped second target sub-class.

8. The method of claim 1, wherein:

the complex SAR range profile data includes an in-phase component of the complex SAR range profile data and a quadrature component of the complex range profile data, the processing the complex SAR range profile data with the RNN includes processing both the in-phase component of the complex SAR range profile data and quadrature component of the complex SAR range profile data with a gated recurrent unit (GRU) neural network (GRUNN) having GRUNN states, the mapping the RNN states to the target class includes mapping the GRUNN states to the target class, and the method further comprises determining a target identification from the mapped target class.

9. The method of claim 8, wherein the processing both the in-phase component of the complex SAR range profile data and quadrature-phase component of the complex SAR range profile data with the GRUNN includes processing the in-phase component of the complex SAR range profile data and quadrature-phase component of the complex SAR range profile data with a plurality of GRU processing cells within the GRUNN utilizing complex operations within each of the plurality of GRU processing cells, and wherein the plurality of GRU processing cells are sequentially connected to each other and each of the plurality of GRU processing cells has a GRU processing cell input that is a temporal sequence $x_t$ and a GRU processing cell output $h_t$ that is a GRUNN state of the GRUNN states.

10. The method of claim 9, wherein each of the plurality of GRU processing cells performs a sub-method that includes:

receiving $x_t$ and a previous GRU processing cell output $h_{t-1}$, and producing an updated gate variable $z_t$ and a reset gate variable $r_t$, wherein the GRU processing cell output $h_t$ is a state variable, wherein:

$z_t$ is produced by a first gate function of a first combination of a first product of a first network parameter $W_z$ and $x_t$, a second product of a second network variable $U_z$ and $h_{t-1}$, and a third network parameter $b_z$, $r_t$ is produced by the first gate function of a second combination of a third product of a fourth network parameter $W_r$ and $x_t$, a fourth product of a fifth network variable $U_r$ and $h_{t-1}$, and a sixth network parameter $b_r$, and $h_t$ is produced by a relationship defined as $h_t=(1-z_t)*h_{t-1}+z_t*\tan h[W_h x_t + +U_h(r_t*h_{t-1})+b_h]$, wherein $W_h$ is a seventh network parameter, $U_n$ is an eighth network parameter, and $b_t$ is a ninth network parameter, wherein the first gate function is a logistic sigmoid function as a function of d defined by $$\frac{1}{1+e^{-d}}$$

and tan h is a second gate function that is a hyperbolic tangent function as a function and of g defined as $$\tanh(g) = \frac{e^g - e^{-g}}{e^g + e^{-g}},$$

wherein * is the Hadamard product operation.

11. The method of claim 10, wherein the $W_z$, $U_z$, $b_z$, $W_r$, $U_r$, $b_r$, $W_h$, $U_h$, and $b_n$ are learned from a learn process performed by the GRU processing cell.

12. The method of claim 11, wherein the first gate function and the second gate function are applied to the in-phase component of the complex SAR range profile data separately from the quadrature component of the complex range profile data.

13. The method of claim 10, wherein the mapping the RNN states to the target class with the multi-layer linear network includes utilizing a two-layer feed-forward neural network, as the multi-layer linear network, to map the GRUNN states to a plurality of class vectors, wherein a class vector $Y_c$ of the plurality of class vectors, is related to a GRUNN vector H, a tenth network parameter $V_1$, eleventh network parameter $V_2$, a twelfth network parameter $b_1$, and a thirteenth network parameter $b_2$, wherein $Y_c$ is defined utilizing a relationship defined as $Y_C=\sigma(V_2\sigma(V_1H+b_1)+b_2)$, wherein $\sigma(d)$ is the first gate function and is a logistic sigmoid function as a function of d, and wherein $V_1$, $V_2$, $b_1$, and $b_2$ are determined by a network training process.

14. The method of claim 13, wherein the determining the target identification from the mapped target class includes determining a magnitude of $Y_c$ to represent a class identification vector $Y_{cm}$ that is defined as $Y_{cm}=[\|y_c^1\|, \ldots \|y_c^m\|]$, where $y_c^i$ is a complex component of $Y_c$.

15. The method of claim 14,
wherein an objective function Obj for training the GRUNN is defined as $$Obj = \frac{1}{N}\Sigma_i \|Y_{cm}(i) - Y_{th}(i)\|,$$

wherein N is a constant that is equal to a total quantity of training data and $Y_{th}(i)$ is a labeled data,
wherein mapping the RNN states to the target class further includes randomly initializing each network parameter $W_z$, $U_z$, $b_z$, $W_r$, $U_r$, $b_r$, $W_h$, $U_h$, $b_n$, $V_1$, $V_2$, $b_1$, and $b_2$ to an initialization value that is uniformly distributed between a range of −1.0 to 1.0, and
wherein the network parameters are updated by relationships $$W_z(t) = W_z(t-1) - \alpha\frac{\partial Obj}{\partial W_z}, U_z(t) = U_z(t-1) - \alpha\frac{\partial Obj}{\partial U_z},$$

$$W_r(t) = W_r(t-1) - \alpha\frac{\partial Obj}{\partial W_r}, U_r(t) = U_r(t-1) - \alpha\frac{\partial Obj}{\partial U_r},$$

$$W_h(t) = W_h(t-1) - \alpha\frac{\partial Obj}{\partial W_h}, U_h(t) = U_h(t-1) - \alpha\frac{\partial Obj}{\partial U_h},$$

$$V_1(t) = V_1(t-1) - \alpha\frac{\partial Obj}{\partial V_1}, \text{ and } V_2(t) = V_2(t-1) - \alpha\frac{\partial Obj}{\partial V_2},$$

where $\alpha$ is a learning rate.

16. An automatic target recognition (ATR) system having a synthetic aperture radar (SAR) configured to perform the method of claim 1, the ATR system comprising:
a memory comprising a plurality of executable instructions and adapted to store template range profile data; the SAR system; and
one or more processors configured as the RNN and the multi-layer linear network for executing the plurality of instructions to perform the method of claim 1.

17. A synthetic aperture radar (SAR) system for target recognition with complex range profile, the SAR system comprising:
a memory;
a recurrent neural network (RNN);
a multi-layer linear network in signal communication the recurrent neural network;
a machine-readable medium on the memory, the machine-readable medium storing instructions that, when executed by the RNN, cause the SAR system to perform operations comprising:
receiving raw SAR data associated with observed views of a scene, wherein the raw SAR data comprises information captured via the SAR system;
radio frequency (RF) preprocessing the received raw SAR data to produce a processed raw SAR data;
converting the processed raw SAR data to a complex SAR range profile data;
processing the complex SAR range profile data with the RNN having RNN states; and
mapping the RNN states to a target class with the multi-layer linear network;
wherein:
the complex SAR range profile data includes an in-phase component of the complex SAR range profile data and a quadrature component of the complex range profile data,
the processing the complex SAR range profile data with the RNN includes processing the complex SAR range profile data with gated recurrent unit (GRU) neural network (GRUNN) having GRUNN states that includes processing both the in-phase component of the complex SAR range profile data and quadrature component of the complex SAR range profile data with a plurality of GRU processing cells within the GRUNN utilizing complex operations within each of the plurality of GRU processing cells.

18. The SAR system of claim 17, wherein the RNN and the multi-layer linear network are configured on one or more processors.

19. The SAR system of claim 17, wherein:
the plurality of GRU processing cells are sequentially connected to each other and each of the plurality of GRU processing cells has a GRU processing cell input that is a temporal sequence $x_t$ and a GRU processing cell output $h_t$ that is a GRUNN state of the GRUNN states.

20. The SAR system of claim 19, wherein:
each of the plurality of GRU processing cells performs a sub-method that includes:
receiving $x_t$ and a previous GRU processing cell output $h_{t-1}$ and producing an updated gate variable $z_t$ and a reset gate variable $r_t$, wherein the GRU processing cell output $h_t$ is a state variable,
wherein:
$z_t$ is produced by a first gate function of a first combination of a first product of a first network parameter $W_z$ and $x_t$, a second product of a second network variable $U_z$ and $h_{t-1}$, and a third network parameter $b_z$,
$r_t$ is produced by the first gate function of a second combination of a third product of a fourth network parameter $W_r$ and $x_t$, a fourth product of a fifth network variable $U_r$ and $h_{t-1}$, and a sixth network parameter $b_r$, and
$h_t$ is produced by a relationship defined as $h_t=(1-z_t)*h_{t-1}+z_t*\tan h \, [W_h x_t + U_h(r_t*h_{t-1})+b_h]$,
wherein $W_h$ is a seventh network parameter, $U_n$ is an eighth network parameter, and $b_h$ is a ninth network parameter,
wherein the first gate function is a logistic sigmoid function as a function of d defined by $$\frac{1}{1+e^{-d}}$$

and $\tan h$ is a second gate function that is a hyperbolic tangent function as a function and of g defined as $$\tanh(g) = \frac{e^g - e^{-g}}{e^g + e^{-g}},$$

and
   wherein * is a Hadamard product operation.
   21. The SAR system of claim 20, wherein the $W_z$, $U_z$, $b_z$, $W_r$, $U_r$, $b_r$, $W_h$, $U_h$, and $b_n$ are learned from a learn process performed by the GRU processing cell.

* * * * *